A. H. ASPROOTH.
FRICTION CLUTCH.
APPLICATION FILED DEC. 27, 1916.
1,236,652.
Patented Aug. 14, 1917.
3 SHEETS—SHEET 1.
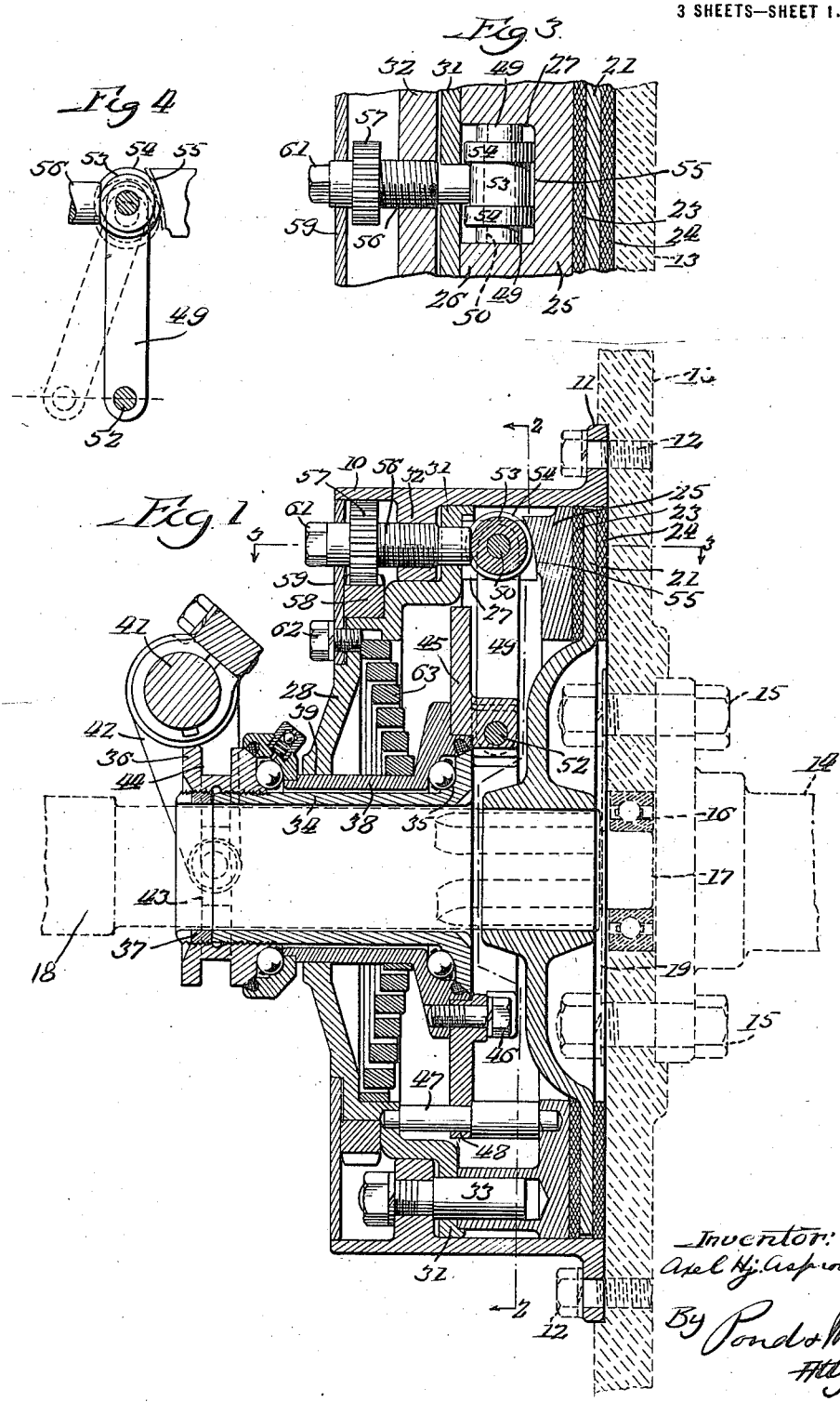

A. H. ASPROOTH.
FRICTION CLUTCH.
APPLICATION FILED DEC. 27, 1916.
1,236,652.
Patented Aug. 14, 1917
3 SHEETS—SHEET 2.
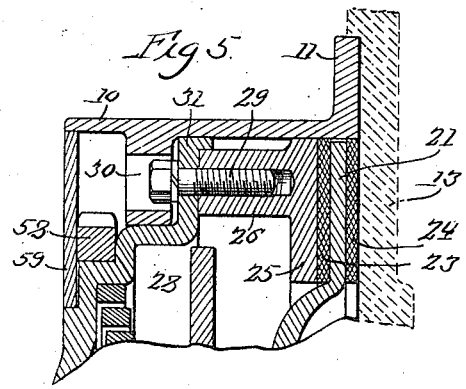
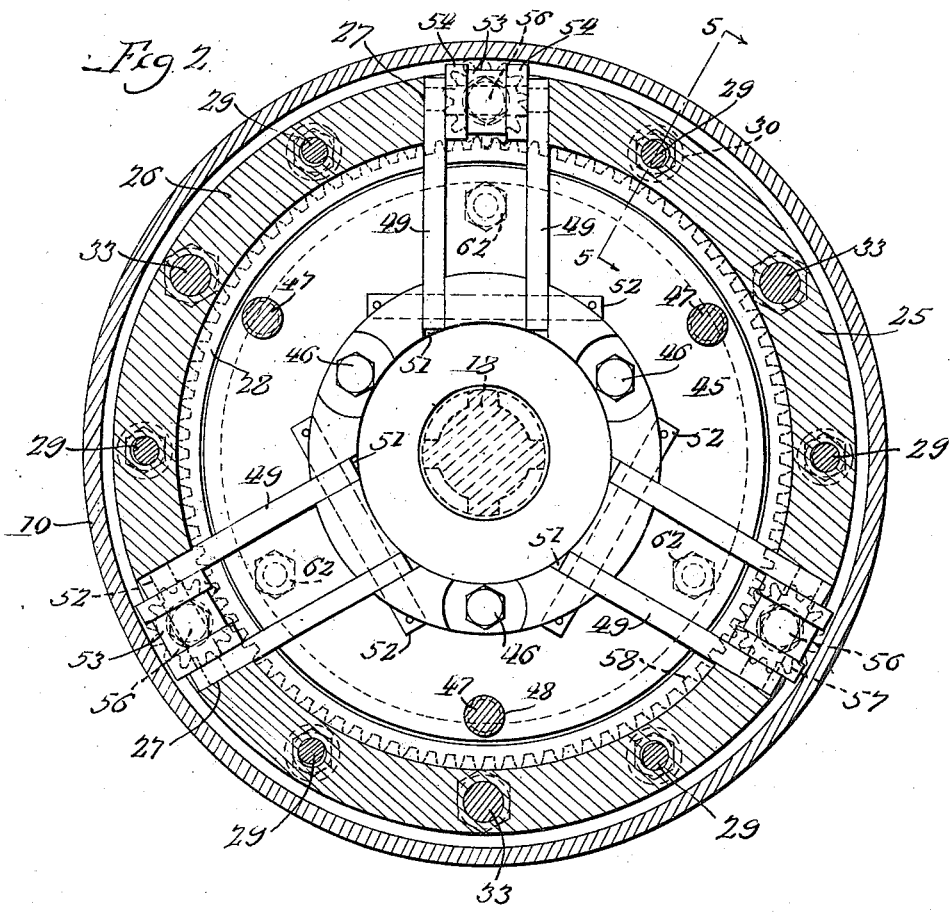
INVENTOR
Axel Hj. Asprooth
By Pond & Wilson
ATTORNEYS

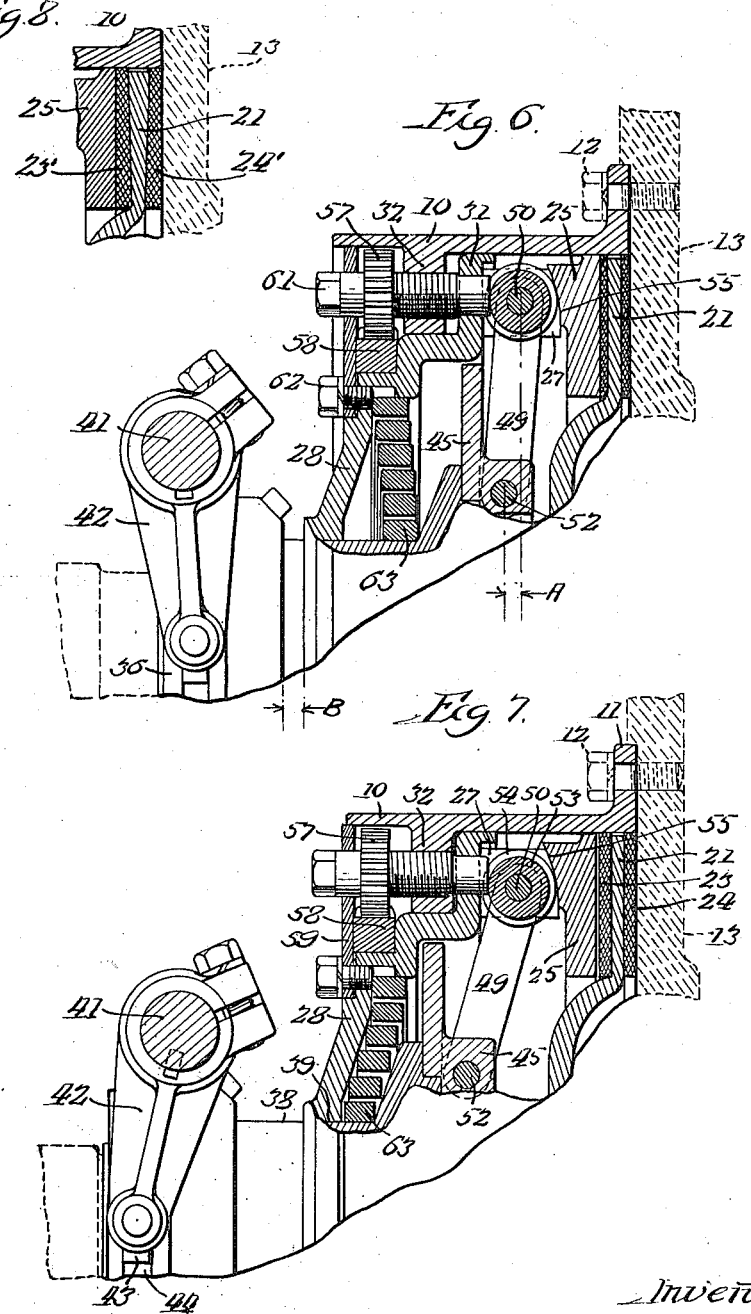

UNITED STATES PATENT OFFICE.

AXEL HJ. ASPROOTH, OF ROCKFORD, ILLINOIS.

FRICTION-CLUTCH.

1,236,652. Specification of Letters Patent. Patented Aug. 14, 1917.

Application filed December 27, 1916. Serial No. 139,098.

*To all whom it may concern:*

Be it known that I, AXEL HJ. ASPROOTH, a citizen of the United States, residing at Rockford, in the county of Winnebago and State of Illinois, have invented certain new and useful Improvements in Friction-Clutches, of which the following is a specification.

This invention relates in general to clutches of the friction type especially adapted for use in motor vehicles although equally well applicable in numerous kinds of machinery.

One of the primary objects of my invention is to provide a friction clutch of generally improved construction embodying various novel features by means of which the clutch may be thrown in and out in a most satisfactory and effectual manner under all conditions of usage, whether at high or low speeds without causing chattering or jerky gripping action, and which allow the parts to be of simple yet substantial and durable construction so that the clutch will be thoroughly practical from the standpoint of operation and may be manufactured at a comparatively low cost.

One of the most important features of my invention resides in the novel mechanism employed to engage and disengage the friction disks. This mechanism, as will appear more fully hereinafter, is designed to allow a finely gradual and yet positive frictional engagement when fully engaged under a very wide range of speeds without detriment to either the clutch elements or the parts driven thereby. In this connection a special feature is the improved thrust arms and the peculiar manner in which they are arranged and operated to secure a maximum mechanical advantage and finely gradual engagement of the disks in the operation of engaging or throwing in the clutch.

Another feature is the novel arrangement of the parts including a thrust spring through the agency of which, under control of the operator, the friction disks are both engaged and disengaged. Thus, but a single spring serving a double function is employed in the clutch.

Still another feature is the provision of improved means of adjustment to take up for wear of the friction disks. The arrangement is such as will allow the take up to be very simply effected by adjustment of a single member which causes the take up to be equally distributed circumferentially about the disks, and, by reason of the novel thrust spring arrangement mentioned above, the thrust effect of the spring is constant and not varied when adjustment has been made.

I have also aimed to provide a clutch in which the throw-out collar or part which carries and moves the thrust arms longitudinally of the clutch is "full floating" about the driven shaft so as to have no bearing thereon. The bearings on the driven shaft found in clutches now in use, frequently burn out and are the source of much trouble and dissatisfaction.

I have further aimed to prevent uneven wearing of the frictionally engaged parts due to uneven thickness of the ordinary commercial asbestos disks, as will appear more fully hereinafter.

These and other objects and attendant advantages will be more readily understood and appreciated by those skilled in the art as the invention becomes better understood by reference to the following description when considered in connection with the accompanying drawings in which,—

Figure 1 is a longitudinal vertical sectional view through a clutch embodying my improvements, showing the driving and driven shafts in dotted lines;

Fig. 2 is a transverse sectional view through the clutch taken substantially on the line 2—2 of Fig. 1;

Fig. 3 is a detail sectional view taken on the line 3—3 of Fig. 1;

Fig. 4 is a fragmentary view of one of the thrust arms and parts immediately coöperating therewith, illustrating the movements of the arms and thrust rings;

Fig. 5 is a detail sectional view taken on the line 5—5 of Fig. 2;

Fig. 6 is a fragmentary sectional view showing the friction disks worn thin and the clutch engaged after adjustment has been made to take up for the wear of the disks;

Fig. 7 is a fragmentary sectional view showing the clutch, as illustrated in Fig. 1, thrown out or disengaged; and Fig. 8 is a cross-sectional view through the frictional disk members showing the central driven disk member shaped to accommodate the somewhat tapered asbestos disks.

When my improved clutch is employed in a motor vehicle it is preferred to form the cylindrical casing or housing designated generally by reference character 10, integral with the fly-wheel of the engine, so that the casing and all parts connected therewith will rotate with the driving element. However in the embodiment illustrated in the drawings the casing 10 is provided with an annular flange 11 secured by means of bolts 12 to a plate 13 (which may be the web of a fly-wheel), in turn fixedly secured to a driving shaft 14 by means of bolts 15. A radial ball bearing 16 in the plate 13 receives the reduced end 17 of a driven shaft 18, and in order to prevent passage of grease and dust between the bearing 16 and the interior of the clutch casing, a division plate 19 of sheet metal or suitable material is clamped to the inner side of the plate 13 by the nuts on the bolts 15. It will be understood, however, that my improvements might be embodied in a structure wherein the shaft 18 is the driving element and the shaft 14 is driven, this reversal of the direction of drive being well understood in the art.

The friction engaging members consist essentially of a friction disk 21 the hub of which is rigidly secured by means of splines or keys to the driven shaft 18, friction rings 23 and 24 of asbestos or suitable material disposed on opposite sides of the disk 21, and a thrust ring designated generally by reference character 25 adapted to be moved longitudinally of the major axis of the clutch to frictionally clamp the disks together and thereby establish a driving connection between the driving and driven elements as will be presently apparent. The thrust ring member 25 while shaped on its innermost side to engage the ring 23 radially throughout the length thereof is reduced on its outer side, providing an annular extension or head 26 in which is formed a plurality, three in the present instance, of equally spaced cutaways or slots 27 in each of which is located the outer end of a thrust arm, described more fully hereinafter. The thrust ring 25, although movable longitudinally of and with respect to the casing 10, turns therewith and is rigidly connected to an inner annular casing or spring housing designated generally by reference character 28, the direct means for securing these two parts rigidly together being bolts 29, shown in Figs. 2 and 5, which pass through the outer radial portion 31 of said spring housing. This structure in turn is connected with the casing 10 so as to rotate therewith and be movable longitudinally thereof. For this purpose the casing 10 is provided with an integral internal flange 32 carrying a plurality of rigid longitudinally extending studs 33 upon which the spring casing 28 and thrust ring 25 are slidably mounted as shown in the lower portion of Fig. 1. The flange 32 is formed with openings 30 so as to avoid interference with the heads of bolts 29. It will thus be seen that the parts 25 and 28 and all parts mounted upon and carried thereby will rotate with the casing 10 and are movable relatively to said casing in a direction lengthwise of the clutch.

The means employed to move the thrust ring 25 longitudinally and thereby throw the clutch in and out will now be described. In the first place this means includes a full floating throw-out collar or, in other words, the collar or means which carries the thrust arms is full floating about the driven shaft and is not mounted so as to have a supporting bearing thereon. This collar is made in several parts so as to provide the proper radial and thrust bearings and allow for connection to the pedal or operating shaft. A sleeve 34 surrounding the shaft 18 and out of bearing contact therewith is provided at one end with a cone 35 of an inner radial and thrust bearing and is threaded at its outer end to receive the yoke shifting collar 36 further secured to the sleeve 34 by a lock-nut 37 threaded oppositely to the threads on the collar 36 and providing the cone of an outer radial and thrust bearing. A collar 38 embraces the sleeve 34 and forms the complement to the end radial and thrust bearings mentioned. The collar 38 has a sliding engagement in and is partly supported by the central portion 39 of the spring casing 28 and is adapted to be moved lengthwise of the clutch by an operator through the medium of a suitable pedal shaft and yoke and other connections not shown. In the present instance the pedal shaft 41 has secured thereto a yoke 42, the opposed arms of which carry pivotal blocks 43 located in the groove 44 of the collar 36, so that when the pedal shaft is rocked the sleeve 34 and collar 38 will be moved as an entirety lengthwise of the driven shaft. The collar 38 has pivotally mounted upon its inner end and carries a plurality of thrust arms which coöperate with the cutaways 27 in the thrust ring 25. In order to provide for the mounting of these thrust arms in a practical manner and for properly supporting the thrust arm carriers, an annular head 45 is rigidly secured to the collar 38 by means of bolts 46. Connection is established between the head 45 of the collar 38 and the parts 25 and 28 so that the collar 38 will rotate with the parts 25 and 28 and consequently with the casing 10 and may be moved longitudinally with respect to said parts 25 and 28 to operate the thrust arms and through these arms cause the thrust ring 25 to engage and disengage the friction disks. The means for establishing this connection consists of pins 47 confined between and seated at their ends in the parts 25 and 28 and passing through apertures 48 in the part 45 so that this part, and consequently the collar 38 may slide lengthwise on the pins 47, being limited at the inner extent of their movement by the shoulders on the enlarged portions of the pins, as clearly shown in Fig. 1. The pins 47 thus serve the double purpose of slidably connecting the thrust arm carrier to a part rotatable with the main casing and of forming stops for limiting the movement of this carrier in one direction, movement in the opposite direction being limited by contact of the radial wall of the head 45 with the casing 28. These stops on the pins 47 determine the fullest extent of the throwing in movement so that when the part 45 is brought into engagement with said stops, if the clutch is not fully engaged, the operator will know that the disks have become worn and adjustment for take up is necessary, as will be more clearly understood hereinafter. The thrust arms each consists of a pair of spaced links 49 located at their inner ends in slots 51 in the carrier 45 and pivotally mounted on pins 52 secured in said carrier, the arms extending radially so that their outer ends are disposed in the cutaways 27 of the thrust ring 25. These thrust arms are each equipped at their outer ends with a plurality of rollers mounted on a single shaft 50 having reduced ends fixedly secured in the links 49 and holding the same in fixed spaced relation. Freely rotatable on each shaft 50 is a central roller 53 and a pair of spaced rollers 54 of larger diameter than the central roller. The rollers 54 bear against the surfaces or seats 55 of the cutaways 27 while the rollers 53 bear against the inner ends of the fixed abutment or thrust bolts 56. These inner ends are at right angles to the longitudinal axis of the clutch. The surfaces 55 are inclined with respect to a plane at right angles to said axis and instead of forming these surfaces in flat planes they are curved and are preferably the arcs of circles. When the arms are moved in a radial direction by means hereinafter described the rollers 53 may revolve independently of the rollers 54 since each set of rollers bears against separate surfaces. The bolts 56 pass through in threaded engagement with the internal flanges 32 of the main casing 10, and, therefore, are normally fixed with respect to the casing. Each thrust bolt is equipped with a rigid spur pinion 57 meshing with a gear or rack 58 mounted for rotative movement on the spring casing 28. The thrust bolts are extended through openings in the cover or clamping plate 59 and are each provided with a head 61 adapted to be turned by means of a wrench or suitable tool to adjust the thrust bolts lengthwise with respect to the casing 10, it being obvious that by adjusting any one of these bolts the remaining thrust bolts will be simultaneously adjusted by reason of the gear connection 58 between the pinions 57. By tightening the bolts 62 which secure the cover plate 59 to the spring casing 28, the gear 58 will be locked in connection with said casing 28, thereby locking the thrust bolts in set position. An expansion spring 63 is interposed between the spring casing 28 and the throw-out collar 38. This spring is preferably of spiral form, as shown, which allows a very compact arrangement of parts. The spring constantly urges the throw-out collar inwardly, that is, lengthwise of the clutch to the right, viewing Fig. 1.

The commercial form of friction rings or disks generally employed in clutches of this type are formed from straight strips of asbestos fiber or other material having a high coefficient of friction. In making a ring a strip of this material of proper length is bent to ring shape, and in so bending the strip the inner portion thereof will be compressed so that this portion of the ring is of a greater cross-sectional thickness than its outer or peripheral portion. In other words, the opposite faces of the ring are not parallel. To overcome this defect the rings are generally compressed to make their faces parallel, but after having become heated by use in a clutch the material expands to its original shape, so that unequal frictional engagement results, causing the frictionally coöperating parts to become unequally worn and also causing unsatisfactory operation. This objection I have overcome by providing the parts which coöperate with the asbestos rings with surfaces complemental to the tapered or non-parallel surfaces of the rings so that the frictional engagement will be uniform throughout the entire faces of the rings. In Fig. 8, I have shown one way of shaping the parts in accordance with the shape of the rings 23' and 24' which it will be noted are of greater cross-sectional thickness at their inner than at their outer edges. In this instance, the opposed faces of the thrust ring 25 and plate 13 are parallel and the faces of the disk 21' are non-parallel so as to conform to the shape of the asbestos rings. However, the faces of the parts 13 and 25 might be tapered instead of tapering the disk 21 as shown, or one face of one of these parts and one face of the disk 21 might be tapered, any arrangement being suitable as long as the engaged faces are complemental and allow equal engagement throughout their width.

In describing the operation of the clutch, a better understanding may be had if it is first considered that when the clutch is disengaged and the driving element is revolved, all the parts rotate with the casing 10 except the friction disk 21, and, of course, the yoke shifting lever and the sleeve 34. The sleeve 34 is allowed to revolve with said parts when the clutch is fully engaged. This will be apparent since the parts 25 and 28 are connected to the casing 10 through the medium of studs 33 and the thrust arm carriage or throw-out collar is connected to the parts 25 and 28 through the medium of pins 47. The parts thus connected together will rotate as a unitary structure and it will be noted that the parts 25 and 28 are movable on the studs 33 as a unit lengthwise of the clutch and with respect to the main casing 10 and that the thrust arm carriage is movable on the pins 47 lengthwise of the clutch and independently of and with respect to the parts 25 and 28. When the clutch is disengaged the parts appear as shown in Fig. 7, in which it will be noted that the thrust arm carriage is moved to the extreme left thereby drawing the thrust arms with it and moving their roller ends inwardly so that in moving down the inclined or curved faces 55 the thrust ring 25 will follow said rollers and allow the friction disks to disengage. To thus disengage the clutch, it will be apparent that the pedal shaft 41 must be rocked in a clockwise direction, viewing Fig. 7, moving the parts to the position shown therein and is held in such position to maintain the clutch out of engagement. It will be here noted that the thrust arms 49 having been retracted the thrust ring 25 which follows the rollers, being directly urged against the same by the spring 63, will allow the friction disks to become disengaged. This will be readily apparent since the collar 38 against which one end of the spring engages is held fixed by the pedal shaft, the pressure of the spring will be exerted outwardly on the casing 28 and consequently upon the thrust ring 25, thereby moving the same outwardly and disengaging the clutch. When the operator releases the pedal shaft the clutch will be engaged under the indirect influence of the spring 63. This spring will move the throw-out collar or thrust arm carriage inwardly, thereby moving the rollers of the thrust arms outwardly in a radial direction in a powerful toggle-like movement, forcing the rollers in a wedge movement between the opposed engaged surfaces. It will be apparent that the nearer the arms 49 approach a plane at right angles to the axis of the clutch, the greater will be the mechanical advantage or thrust imparted to the outer end of the arms, and in direct proportion with this increase in leverage the outward movement of the rollers will be decreased. Since the rollers are confined between fixed abutments on one side and a movable inclined or curved surface on the other, the latter, or rather the thrust ring 25 will be moved lengthwise to frictionally engage the clutch. It will be here noted that if the inclined faces 55 were flat planes inclined in the general direction of the curved surfaces shown, the thrust ring would be moved inwardly quite rapidly during the initial movement of the thrust arm carriage and during the final movement thereof when the greatest leverage is applied there would be very slight movement of the thrust ring, so that the power is not applied to the best advantage to engage the clutch. These advantages, however, are accomplished by the provision of curved arcuate surfaces 55 by reason of which a uniformly gradual movement may be imparted to the thrust ring in direct proportion or even in an increasing proportion to the movement of the thrust arm carriage. Thus during the initial inward movement of the thrust arm carriage in which the thrust rollers are moved outwardly quite rapidly, comparatively speaking, there will be but a slight gradual compression of the friction disks instead of a quick gripping action, and, when the greatest thrust is imparted to the rollers as the arms approach but not necessarily reach their right angle position the thrust ring will be moved inwardly in an increasing proportion with respect to the final thrust movement of the thrust arms so as to insure a positive and full frictional engagement under the influence of the greatest mechanical advantage derivable from the leverage arrangement. Thus when the clutch is thrown in, regardless of whether the engine is running at a slow or fast speed the frictional engagement will be very gradual, the greatest thrust being applied in the final movement when it is desired to effect the positive connection. When the asbestos disks become worn through usage a take up adjustment may be made. The first step is to loosen the bolts 62 so as to permit free rotation of the gear 58, then to withdraw the throw-out collar to such an extent that the distance A indicated in Fig. 6, is equal to substantially one-third to one-half of the full movement of the throw-out collar, which distance may be instantly determined or observed by the operator by reference to the distance B. The throw-out collar is held in this position while the thrust bolts are adjusted inwardly until the friction disks are fully engaged, whereupon the bolts 62 will be retightened to lock the gear 58 and consequently the thrust bolts in set position. Such an adjustment is shown as having been made in Fig. 6 in which it will be noted that the asbestos rings are worn quite thin and that the thrust nut is adjusted inwardly to almost its fullest extent, the clutch being shown engaged. It will be noted that in making this adjustment the relative relation of the parts 25 and 28 is not changed, nor is there any change in the relation of the thrust arm carriage with respect to said parts so that there is no variation in the effect of the thrust spring. It will be further noted that there are no parts having a bearing on the driven shaft, since the parts 25 and 28 are mounted upon and carried by the main casing 10 through the agency of the studs 33, and the thrust arm carriage is slidably supported on the pins 47 and in the bearing 39, the sleeve 34 and shifting collar 36 being supported through the radial and thrust bearings at opposite ends of the sleeve. Thus the throw-out collar or thrust arm carrier may be said to be full floating about the driven shaft. By reason of this construction there is positively no danger of burning bearings on the driven shaft, since the movable parts of the clutch are out of frictional engagement therewith.

A further advantage of the thrust bolts 56 is found in assembling the clutch. It is here desirable to adjust each thrust bolt independently so that the disks will be equally engaged circumferentially. When each thrust bolt has been thus set, the gear 58 will be mounted on the housing 28, thereby positively holding the thrust bolts in proper relative relation and maintaining this relation under any subsequent adjustment of the thrust bolts simultaneously.

It is believed that the foregoing conveys a clear understanding of the construction and operation of my improvements and of the objects prefaced above, and it should be understood that while I have shown one practical embodiment of my improvements, various changes may be made in the construction and arrangement of parts to accomplish the desired objects without departing from the spirit and scope of the invention as expressed in the appended claims.

I claim:

1. In a friction clutch, the combination of a driving element, a driven element, a casing fixed to one of the elements and embracing the other, frictionally engageable parts between said elements, a thrust member within and movable longitudinally of the clutch to engage said parts, a plurality of radially arranged thrust arms movable at their inner ends longitudinally of the clutch and freely disposed at their outer ends between opposed convergent surfaces on said thrust member and parts fixed with respect to the casing, each thrust arm being equipped at its outer end with a pair of concentric rollers, each of which is arranged to engage with its respectively opposed surface only so that when the thrust arms are moved outwardly by longitudinal movement of their inner ends the thrust member will be moved to frictionally engage said parts.

2. In a friction clutch, the combination of a driving element, a driven element, a casing fixed to one element and embracing the other, a thrust member within said casing rotatable therewith and movable lengthwise to cause said driving and driven elements to be frictionally engaged, and a second member within said casing rotatable therewith and movable longitudinally thereof, and equipped with a plurality of radially extending thrust arms pivotally mounted at their inner ends on said member and freely disposed at their outer ends between opposed surfaces on the first named member and a part fixed to the casing so that the free ends of said arms will be moved radially as its carrying member is moved longitudinally, one of the surfaces engaged by the outer end of each thrust arm being inclined with respect to a plane at right angles to the longitudinal axis of the clutch so as to move the thrust member longitudinally when the second member is correspondingly moved, each thrust arm being equipped at its outer end with a pair of spaced concentric rollers in peripheral engagement with but one of said opposed surfaces and with a roller interposed concentrically between said rollers and in peripheral engagement with the other of said opposed surfaces.

3. In a friction clutch, the combination of a driving element, a driven element, frictionally engageable parts operable between said members and engageable to establish a driving connection therebetween, and a plurality of radially movable thrust arms operable in a wedging thrust action between a fixed part and a part for moving said frictionally engageable parts into engagement, one of the surfaces in each wedging engagement being curved in a radially extending plane parallel with the longitudinal axis of the clutch, so as to extend into the path of its respective thrust arm.

4. In a friction clutch, the combination of a driving element, a driven element, frictionally engageable parts operable between said members and engageable to establish a driving connection therebetween, a carrier embracing and movable lengthwise of the longitudinal axis of the clutch, a plurality of thrust arms pivotally mounted upon and carried wholly by said carrier, said arms being equipped at their outer ends with a plurality of concentric rollers of different diameters, which rollers are disposed between and respectively in peripheral engagement with a part fixed to one of said elements and an inclined face for moving one of said frictionally engageable members, whereby upon moving said carrier lengthwise the outer ends of the thrust arms will be moved in a general radial direction, causing said parts to be frictionally engaged.

5. In a friction clutch, the combination of a driving element, a driven element, frictionally engageable parts adapted to establish a driving connection between said elements, a thrust member for moving one of said frictionally engageable parts, a plurality of thrust arms for moving said thrust member, means for moving said arms, and a single expansion spring arranged so that its pressure may be applied between said thrust arm moving means and said thrust member to engage said parts through the agency of the thrust arms when said thrust arm moving means is allowed to move in one direction and to disengage said parts by direct pressure on said thrust member when said thrust arm moving means is retracted.

6. In a friction clutch, the combination of a driving element, a driven element, a casing fixed to one element and embracing the other, a thrust member within said casing rotatable therewith and movable longitudinally thereof, a spring housing within said casing secured to said thrust member, a plurality of thrust arms for moving said thrust member to cause the clutch to be frictionally engaged, means within said spring casing movable lengthwise of the clutch for actuating said thrust arms, and an expansion spring interposed between said spring casing and said means so that the spring will engage the clutch indirectly through said means when the same is allowed to move in one direction and so that said spring casing and thrust member are movable under the direct influence of the spring to disengage the clutch when said means is retracted.

7. In a friction clutch, the combination of a driving element, a driven element, frictionally engageable parts between said elements engageable to establish a driving connection therebetween, a thrust member movable longitudinally of the clutch to engage said parts, a casing fixed to said thrust member, a member within said casing movable lengthwise of the clutch and with respect to said casing, means operated by said member to move said thrust member longitudinally to engage the clutch, an expansion spring within said casing interposed between the same and said longitudinally movable member tending to constantly urge the longitudinally moving member in a direction to engage the clutch, and means for moving said longitudinally movable member in a direction opposite to the force of said spring whereby to disengage the clutch and permit said thrust member to be retracted through the influence of said spring.

8. In a friction clutch, the combination of a driving element, a driven element, a casing fixed to one element and embracing the other, a thrust member within the casing rotatable therewith and movable lengthwise thereof, a plurality of thrust arms coöperable with said member to move the same longitudinally to engage the clutch, a throw-out collar or the like movable longitudinally of the clutch for moving said thrust arms, said collar having radially extending portions, guides upon which said collar is slidable, and stops at the ends of the guides for limiting the movement of the throw-out collar and consequently of the thrust arms in a clutch engaging direction.

9. In a friction clutch, the combination of a driving element, a driven element, a casing fixed to one of the elements and embracing the other, frictionally engageable parts between said elements, a thrust member mounted within and movable longitudinally of the clutch to engage said parts, a plurality of thrust bolts mounted on the casing in alinement with said thrust member and adjustable longitudinally upon and with respect to the casing, a plurality of radially arranged thrust arms freely disposed at their outer ends between opposed surfaces on said thrust bolts and thrust member, certain of said opposed surfaces being inclined with respect to a plane at right angles to the longitudinal axis of the clutch, and means for moving the inner ends of the thrust arms longitudinally of the clutch thereby causing the thrust member to be moved through the agency of the thrust arms to frictionally engage said parts.

10. In a friction clutch, the combination of a driving element, a driven element, a casing fixed to one of the elements and embracing the other, a thrust member within the casing rotatable therewith and movable longitudinally thereof, a spring casing within the main casing and fixedly secured to said thrust member, a plurality of thrust bolts or the like mounted on the main casing in circumferentially spaced relation so as to present surfaces opposed to and in longitudinal alinement with surfaces on said thrust member, a plurality of radially extending thrust arms having their outer ends freely disposed between said opposed bolt and thrust member surfaces, a thrust arm carrier within the spring casing movable longitudinally of the clutch and with respect to said casing, an expansion spring interposed between said spring casing and thrust arm carrier constantly urging the latter in a direction to move the outer ends of the thrust arms outwardly, the said opposed bolt and thrust member surfaces engaged by the thrust arms being converged so that said ends may be moved outwardly in a wedging engagement between said surfaces to thereby move the thrust member longitudinally, and means under the control of the operator for moving said thrust arm carrier longitudinally.

11. In a friction clutch, the combination of a driving element, a driven element, a casing fixed to one of the elements and embracing the other, a thrust member within the casing rotatable therewith and movable longitudinally thereof, a spring casing within the main casing and fixedly secured to said thrust member, a plurality of thrust bolts or the like mounted on the main casing in circumferentially spaced relation so as to present surfaces opposed to and in longitudinal alinement with surfaces on said thrust member, a plurality of radially extending thrust arms having their outer ends freely disposed between said opposed bolt and thrust member surfaces, a thrust arm carrier within the spring casing movable longitudinally of the clutch and with respect to said casing, an expansion spring interposed between said spring casing and thrust arm carrier constantly urging the latter in a direction to move the outer ends of the thrust arms outwardly, the said opposed bolt and thrust member surfaces engaged by the thrust arms being converged so that said ends may be moved outwardly in a wedging engagement between said surfaces to thereby move the thrust member longitudinally, a gear revolubly mounted on the spring casing, a pinion fixed to each of said thrust bolts and meshing with said gear whereby the gear may be rotated to adjust said thrust bolts longitudinally in unison, and means for locking the gear in set position.

12. In a friction clutch, the combination of a driving element, a driven element, a main casing fixed to one of the elements and embracing the other, frictionally engageable parts within the main casing for establishing a driving connection between the driving and driven elements, a casing within the main casing rotatable therewith and movable longitudinally with respect thereto and coöperable with said frictionally engageable parts to move the same into engagement, thrust means within the second named casing coöperable with the main casing to move the second casing longitudinally, and means carrying said thrust means and mounted wholly upon and supported by the second named casing and movable longitudinally with respect thereto to cause the frictionally engageable parts to be engaged.

13. In a friction clutch, the combination of a driving element, a driven element, a main casing fixed to one of the elements and embracing the other and equipped with a plurality of circumferentially spaced and longitudinally extending bearing posts, a combined thrust ring and spring casing within the main casing mounted so as to slide lengthwise on said bearing posts, a plurality of circumferentially spaced abutment members fixed to the main casing and disposed in longitudinal alinement with surfaces on the thrust ring, a plurality of radially extending thrust arms the outer ends of which are disposed between the opposed surfaces of said abutments and thrust ring, said opposed surfaces being converged outwardly, a thrust arm carrier within the second casing mounted upon and in connection therewith so as to slide longitudinally thereof, said thrust arms being pivotally mounted at their inner ends upon and carried wholly by said carrier, an expansion spring interposed between the second casing and said carrier for urging the same longitudinally in a direction to move the outer ends of the thrust arms outwardly, and means for moving the carrier longitudinally.

14. In a friction clutch, the combination with a driving and a driven element, of means for establishing frictional driving connection between said elements including opposed members, one of which is movable longitudinally of the clutch axis for establishing said driving connection, said members having convergent surfaces, a plurality of substantially radially disposed thrust arms each equipped at its outer end with a plurality of concentric rollers interposed between said convergent surfaces with each of the latter engaged by different rollers, and means for moving the thrust arms radially whereby to move the rollers in a wedging engagement between said convergent surfaces to thereby establish said frictional driving connection.

15. In a friction clutch, the combination with a driving and a driven element, of means for establishing frictional driving engagement between said elements including opposed surfaces, one of which is movable relatively to the other to establish said driving connection, one of the surfaces being inclined with respect to a plane at right angles to the longitudinal axis of the clutch and having a different degree of inclination at different distances radially from the central axis of the clutch, a plurality of thrust members interposed between said opposed surfaces, and means for moving said thrust members radially to engage the clutch so that during the initial movement of the thrust arms they will operate upon the least inclined portion of said surfaces and during their final movement upon the greatest inclined portion to thereby obtain the most effectual wedging action in establishing the driving connection.

16. In a friction clutch, the combination with a driving and a driven element, of frictionally engageable parts adapted to establish driving connection between said elements, a thrust ring for moving one of said frictionally engageable parts and provided with a plurality of circumferentially spaced cutaways, surfaces in longitudinal alinement with said cutaways and fixed with respect to one of said elements, means movable radially and disposed in said cutaways to engage said thrust ring and fixed surfaces, one of each of the surfaces thus engaged being inclined with respect to a plane at right angles to the longitudinal axis of the clutch so that when said means is moved radially the thrust ring will be moved longitudinally to frictionally engage the clutch.

17. In a friction clutch, the combination of a driving and a driven element, frictionally engageable parts adapted to establish a driving connection between said elements, a thrust member for moving one of said frictionally engageable parts, means operable between said thrust member and one of said elements for moving the thrust member including a central shifting member movable longitudinally of the clutch axis, a plurality of radial thrust arms carried by said central member, each comprising a pair of radially extending spaced links pivotally mounted on the central member on an axis transverse to the longitudinal axis of the clutch, and a plurality of rollers of different diameters rotatably mounted upon and intermediate the outer portions of said links, the different sized rollers of each arm being adapted to engage respectively with said thrust member and a part fixed with respect to one of said elements, and means for moving said central member longitudinally to operate the thrust arms and thereby cause the clutch to be engaged.

18. In a friction clutch, the combination with a driving and a driven element, of a casing fixed to one element and embracing the other, a thrust member within said casing rotatable therewith and movable longitudinally thereof and adapted in the latter movement to cause the clutch to be frictionally engaged, a spring housing within said casing secured to said thrust member, a central member shiftable longitudinally of the clutch axis, means operated by said central member for moving the thrust member longitudinally, an expansion spring interposed between said central member and spring housing and constantly urging the central member in a direction to cause the clutch to be engaged, and means operable at will for shifting said central member longitudinally whereby upon retracting said central member said thrust member will be moved in a clutch-disengaging direction through the agency of the expansion spring and spring housing.

19. In a friction clutch, the combination with a driving and a driven element, of means for establishing frictional driving connection between said elements comprising a thrust member movable longitudinally of the clutch axis, a housing fixed to the thrust member, means within said housing and movable longitudinally of the clutch axis for moving the thrust member in a direction to engage and disengage the clutch, an expansion spring interposed between said means and the housing and normally urging said means in a direction to cause the clutch to be engaged, and means operable at will to move said thrust member moving means so that upon movement of the latter in a direction against the pressure of said spring the clutch will be disengaged through the influence of the spring upon the housing.

20. In a friction clutch, the combination with a driving and a driven element, of means for establishing frictional driving connection between said elements comprising a thrust ring member movable longitudinally of the clutch axis to establish said driving connection, a shifting member, means operable between the shifting member and thrust ring member for moving the same to engage the clutch, an expansion spring arranged to constantly urge said shifting member in a direction to cause the clutch to be engaged, and means constantly influenced by the spring and connected with the thrust ring member for moving the same under the influence of the spring in a direction to disengage the clutch when said shifting means is moved in a retracting direction.

21. In a friction clutch, the combination with a driving and a driven element, of parts frictionally engageable to establish driving connection between said elements, a shifting member, means operable between the shifting member and one of said parts for moving the same to cause the clutch to be engaged and disengaged, an expansion spring constantly urging said shifting member in a direction to cause the clutch to be engaged, and means whereby the spring pressure will be applied directly to said clutch engaging part upon movement of the shifting member in a retracting direction to thereby cause the clutch to be disengaged through the influence of the spring.

22. In a friction clutch, the combination with a driving and a driven element, of means for establishing a frictional driving connection between said elements including a part movable into and out of clutch-engaging position, a shifting member, and means operable between the shifting member and said part including a single expansion spring, the pressure of which will cause the clutch to be engaged when said shifting member is allowed to move in a clutch-engaging direction and which will cause the clutch to be disengaged when said shifting member is moved in a retracting direction.

23. In a friction clutch, the combination with a driving and a driven element, of means for establishing frictional driving connection between said elements including a shifting member movable in opposite directions to cause the clutch to be engaged and disengaged, and an expansion spring the pressure of which is constantly applied to said shifting member so that when the same is released the pressure will move the shifting member in a direction to engage the clutch and when said shifting member is moved in the opposite direction said spring pressure will be employed to disengage the clutch.

24. In a friction clutch, the combination with a driving and a driven element, of means for establishing frictional driving connection between said elements including a thrust member and a shifting member respectively movable longitudinally of the clutch axis, and means operable between the thrust member and shifting member for causing the thrust member to engage and disengage the clutch upon movement of the shifting member in opposite directions including an expansion spring, the pressure of which is constantly applied between said thrust member and shifting member in such manner that upon releasing the shifting member the spring pressure will cause the thrust member to be moved in a direction to engage the clutch and upon moving the shifting member in a retracting direction the pressure will be applied to said thrust member to cause the clutch to be disengaged.

25. In a friction clutch, the combination with a driving and a driven element, of means for establishing a frictional driving connection between said elements comprising, a part embracing one of the elements and movable longitudinally thereof to cause the clutch to be frictionally engaged, said part having circumferentially spaced cutaways therein, a central shifting member movable longitudinally of the clutch, and a plurality of radially disposed thrust arms pivotally mounted at their inner ends on said shifting member and disposed at their outer ends in said cutaways and thereby held against lateral displacement, said thrust arms being so coöperable at their outer ends with the clutch-engaging part, that upon movement of the shifting member longitudinally in one direction the clutch will be engaged through the operative effect of said thrust arms upon said part.

26. In a friction clutch, the combination with a driving and a driven element, of means for establishing driving connection between said elements comprising a thrust ring member movable longitudinally of the clutch axis to cause the clutch to be engaged and disengaged, a central shifting collar movable longitudinally of the clutch axis and having a radial flange or its equivalent, a plurality of radial thrust arms pivotally mounted at their inner ends on said collar and coöperable at their outer ends with said member so that upon moving the collar longitudinally the thrust arms will have a wedging effect upon the thrust ring member causing the same to engage the clutch, and a plurality of slideway guides parallel with the longitudinal axis of the clutch and fixed with respect to the thrust ring member and slidably engaged by the flange of the shifting collar so as to cause the latter to rotate with the thrust ring member and to be slidable longitudinally thereof.

27. In a friction clutch, the combination with a driving and a driven element, of means for establishing a frictional driving connection between said elements comprising a thrust ring member rotatable with and movable longitudinally of one of said elements for frictionally engaging the clutch, a spring casing rotatable with said ring member, a plurality of circumferentially spaced pins confined between and secured at their ends to the thrust ring member and spring casing, a central shifting member movable longitudinally of the clutch axis and provided with radially projecting portions slidably coöperating with said pins so that said central shifting member will rotate with the thrust member and spring casing and will be movable longitudinally of and with respect thereto, and a plurality of radially extending thrust arms coöperable at their inner and outer ends respectively with said central shifting member and the thrust ring member to cause the latter to engage the clutch upon shifting said central member longitudinally.

28. In a friction clutch, the combination with a driving and a driven element, of means for establishing a frictional driving connection between said elements comprising a casing fixed to one element and embracing the other, a thrust ring member within the casing rotatable therewith and movable longitudinally thereof to cause the clutch to be engaged, a central shifting collar equipped with a plurality of radially extending thrust arms the outer ends of which are coöperable with said ring member, adjustable means carried by said casing and arranged so that the outer ends of the thrust arms will be interposed between opposed surfaces on said adjustable means and the thrust ring member, which opposed surfaces are convergent so that when said central shifting member is moved longitudinally the thrust arms will be moved in a wedging engagement between said convergent surfaces to move the thrust ring member in a direction to engage the clutch, said adjusting means being adjustable relatively to the casing to vary the proximity of said opposed surfaces so as to take up for wear of the frictionally engageable parts.

29. In a friction clutch, the combination with a driving and a driven element, of a casing fixed to one of the elements and embracing the other, a thrust ring member within the casing rotatable therewith and movable longitudinally thereof to cause the clutch to be engaged, a plurality of abutment members circumferentially spaced and connected to said casing in longitudinal alinement with the thrust ring member, a central shifting member, radially movable means adapted to be actuated by said central shifting member and to be engaged intermediate said abutment members and the thrust ring member, the opposed surfaces of which members engaged by said radially movable means being convergent so that upon moving said means radially the thrust ring member will be moved longitudinally to engage the clutch, said abutment members being adjustable with respect to the casing to vary the proximity of said convergent surfaces to take up for wear of the frictionally engageable parts.

30. In a friction clutch, the combination with a driving and a driven element, of means for establishing a frictional driving connection between said elements including a casing fixed to one of the elements and embracing the other, a thrust ring member rotatable with and movable longitudinally of said casing for causing the clutch to be frictionally engaged, a plurality of circumferentially spaced thrust bolts threadingly engaged with the casing in longitudinal alinement with the thrust ring member, each thrust bolt and the thrust ring member forming opposed converging surfaces, and means interposed between said opposed surfaces and movable radially at will in a wedging engagement to cause the thrust ring member to frictionally engage the clutch.

31. In a friction clutch, the combination with a driving and a driven element, of means for establishing a frictional driving connection between said elements, including a central throw-out collar structure full floating about one of said elements and movable longitudinally thereof, said collar structure comprising an inner collar and an outer collar having a radial and thrust bearing on the inner collar, means operated by the outer collar in its longitudinal movement to establish said frictional driving connection, said inner collar having an annular groove, and a shifting device equipped with blocks disposed in said annular groove whereby the collar structure may be shifted longitudinally.

32. In a friction clutch, the combination with a driving and a driven element, of means for frictionally engaging said elements including a plurality of ring members of relatively high coefficient of friction and having non-parallel faces, and parts having faces complementary to and coöperable with said faces of the ring members, said ring members being formed of strips of woven material shaped into annular form by which action the inner portion of the ring members thus formed is of greater cross-sectional thickness than the peripheral portion of said members, the ring members being arranged so that their narrow portions are complemental to the thick portion of the adjacent frictionally engaged part or parts.

AXEL HJ. ASPROOTH.